United States Patent [19]
Presley

[11] 4,412,794
[45] Nov. 1, 1983

[54] ULTRA-HIGH TORQUE ACTUATORS

[75] Inventor: Rex W. Presley, Livonia, Mich.

[73] Assignee: The Bendix Corporation, Teterboro, N.J.

[21] Appl. No.: 230,161

[22] Filed: Jan. 30, 1981

[51] Int. Cl.³ .............................................. F01C 1/063
[52] U.S. Cl. .................................... 418/61 R; 310/82; 310/83; 74/804
[58] Field of Search ........................ 310/82, 83, 49, 67, 310/90, 208, 254, 261; 74/804, 805; 418/61 R

[56] References Cited

U.S. PATENT DOCUMENTS

| | | | |
|---|---|---|---|
| 3,165,943 | 1/1965 | Sundt | 74/804 |
| 3,334,253 | 8/1967 | Hill | 310/82 |
| 3,452,227 | 6/1969 | Welch | 310/49 R |
| 3,512,019 | 5/1970 | Durand | 310/67 R |
| 3,516,765 | 6/1970 | Boyadjieff | 418/61 R |
| 3,558,944 | 1/1971 | Verge | 310/82 |
| 3,561,006 | 2/1971 | Humphreys | 310/82 |
| 3,577,049 | 5/1971 | Madurski | 310/83 |
| 3,602,070 | 8/1971 | Verge | 74/804 |
| 3,602,615 | 8/1971 | Erwin | 418/61 R |
| 3,770,997 | 11/1973 | Presley | 310/82 |
| 3,876,100 | 4/1975 | Brudi | 74/804 |
| 4,177,695 | 12/1979 | Grove | 74/804 |

*Primary Examiner*—R. Skudy
*Attorney, Agent, or Firm*—Anthony F. Cuoco; Markell Seitzman

[57] ABSTRACT

An actuator for rotating an output member, having an epicyclic transmission adapted to rotate the output member in response to the motion of a rotor which contains a plurality of radial projections which interact with a stator or non-rotating portion of the actuator to produce a rotating tangential force vector directed substantially perpendicular to the radial projections.

9 Claims, 19 Drawing Figures

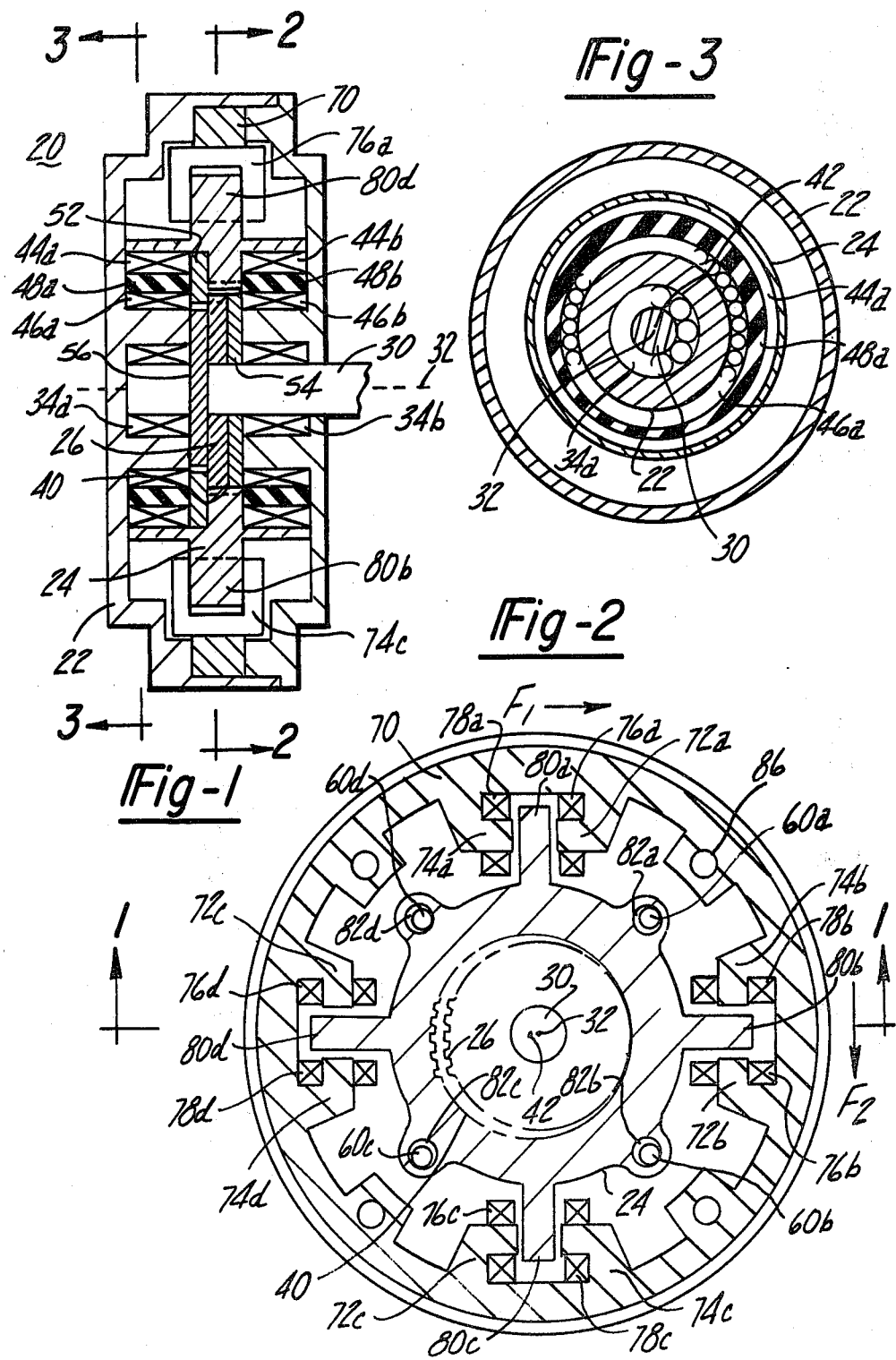

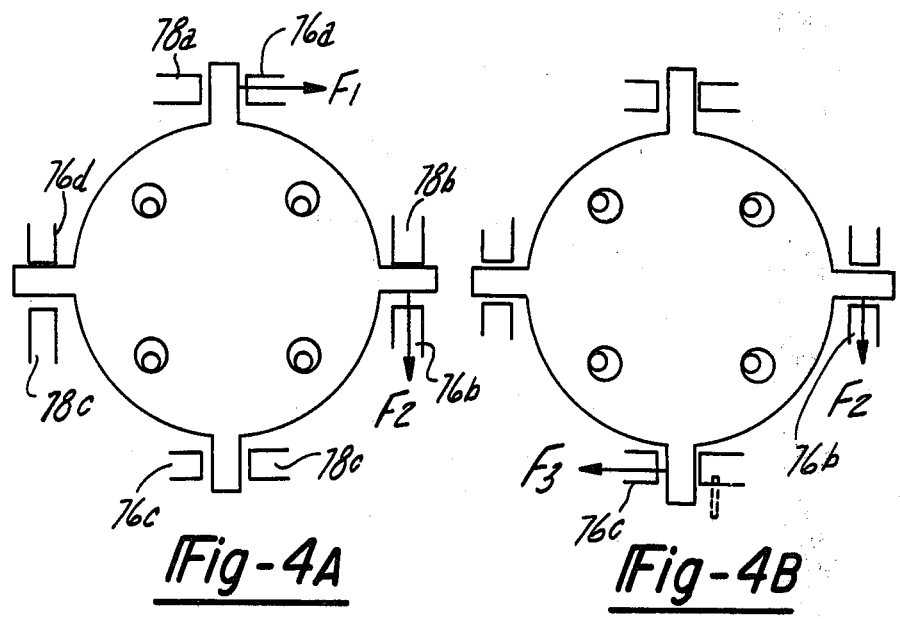
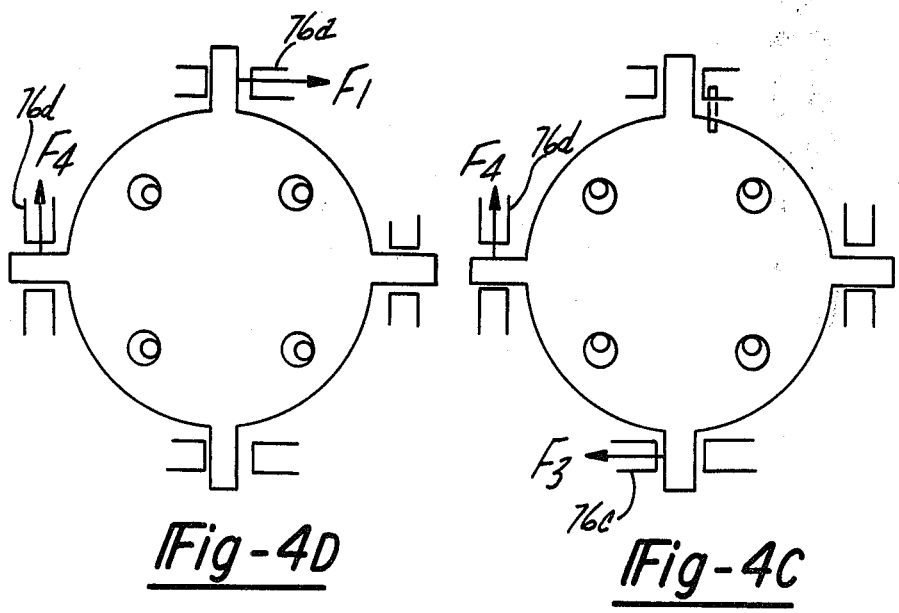

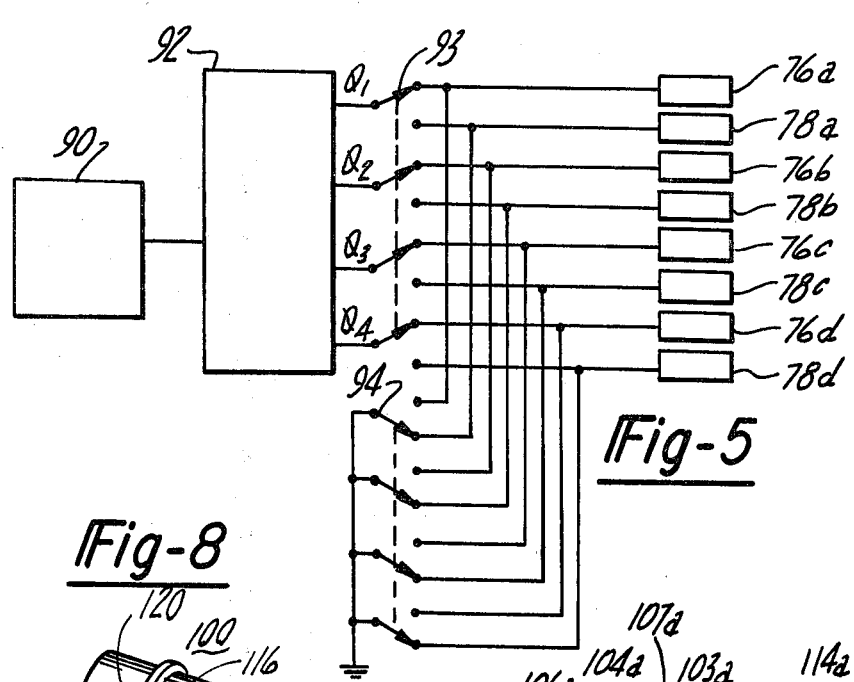
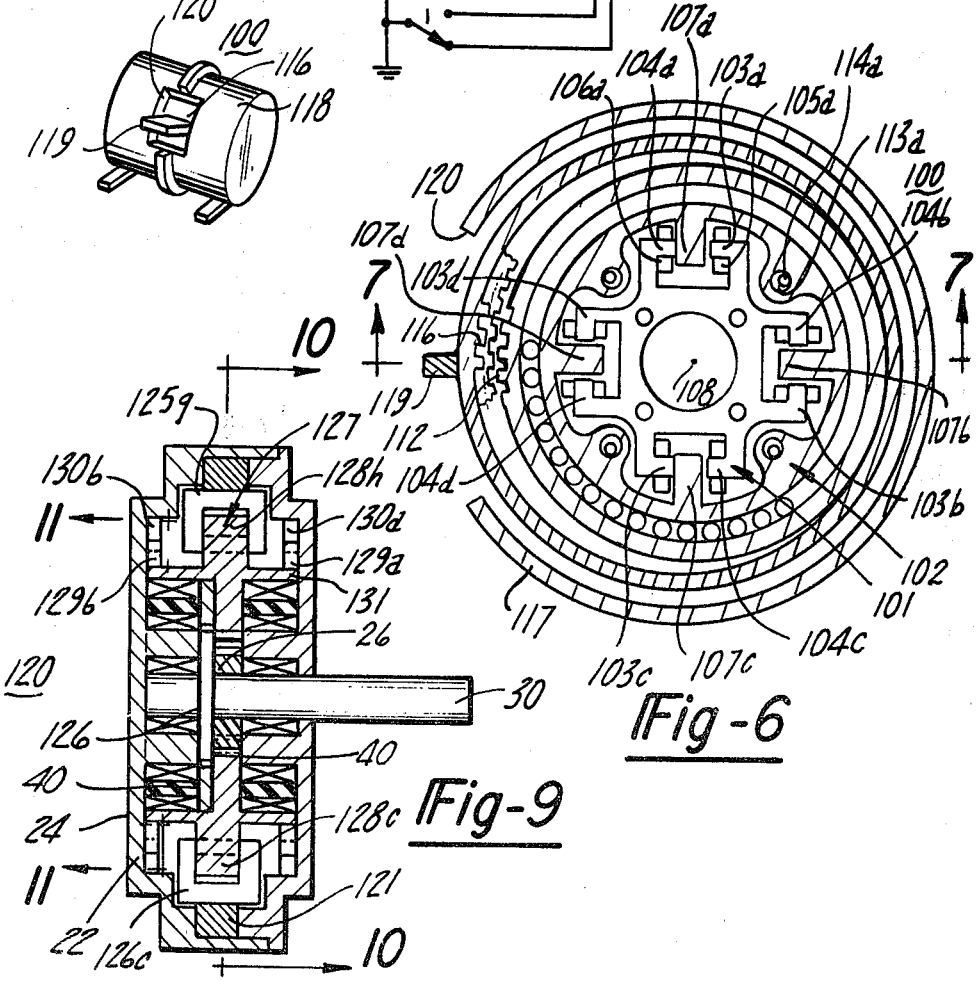

ULTRA-HIGH TORQUE ACTUATORS

BACKGROUND AND SUMMARY OF THE INVENTION

This invention concerns rotary actuators and more specifically rotary actuators having means for generating a tangential force vector on a rotor housed therein.

Eccentric or epicyclic reduction gearing has long been known and utilized as a compact and efficient transmission system for rotary actuators. These actuators have integrated the power element and the epicyclic transmission into an integral actuator which has the attributes of a low inertia and high efficiencies at rated loads. The basic components of these rotary actuators comprise a rotor, a ring gear attach thereto, a stationary or ground gear and output gear. In essence the eccentric positioning of the ring gear in relationship to the output gear forms the epicyclic transmission system. In high gear ratio applications the rotor motion consists of a high speed orbital motion combined with a low speed rotation about the ground gear. In low gear ratio applications the gear mesh between the ring gear and the stationary or ground gear provides a displacement motion without rotation since both gears have exactly the same number of teeth. Illustrative of these types of rotary actuator, using epicyclic gearing, is U.S. Pat. No. 3,770,997 to Presley. The basic deficiencies with this type of rotary actuator, as well as other variable reluctance electric actuators or similar hydraulic or pneumatic actuators as illustrated by Boyadjieff et al in U.S. Pat. No. 3,516,765 is that the force vector that is exerted on the rotor is essentially applied in a radial direction. It can be shown that the force is directed through the center of the rotor which is eccentrically located relative to the center of the output gear. Typically this eccentric distance is only a few tenths of an inch and consequently only a small component of the applied force goes into producing useful work that is, goes into producing a moment to drive the output member. Consequently the prior art requires the generation of extremely high forces in order to produce significant levels of output torques thus requiring an actuator that is large and one that will typically consume excessive power because of its size, weight, inertia and inherent internal friction.

The present invention relates to a new rotary actuator concept for producing forces that are applied tangentially to the rotor as opposed to forces which are directed through the eccentric as illustrated in the prior art. Consequently virtually all of the force generated by the new actuator goes into producing torque or useful work. According to the specific embodiments detailed below the present invention relates to an electric rotary actuator having a rotor that is constrained to move in an orbiting, non-rotating fashion about an output gear. The orbiting non-rotating motion of the rotor is produced by the interaction of circular holes in the rotor with fix reaction pins or equivalent. As will be discussed below the rotor displaces or orbits about these reaction pins. The orbiting motion of the rotor is transmitted through an epicyclic transmission to the output gear or member which is adapted to engage a load to be rotated or otherwise moved. The rotor contains a number of radially situated rectangular projections or poles which extend into coil spaces between respective poles of a stator which in turn is affixed to a housing. By controlling the excitation sequence of the coils on the stator the rotor is set into the orbiting motion about the reaction pins. The selective interaction between the rotor projections or poles and the coils mounted on the stator produce a tangentially rotating force vector.

In an alternate embodiment of the invention the reaction pins and circular holes within the rotor are replaced by a rotor having a ring gear with a peripherally situated gear teeth which interact with a stationary or ground gear which is affixed to the housing. The gear mesh therebetween permits the required orbiting motion without rotation of the rotor because of the number of gear teeth in the rotor and in the ground gear may be chosen to be exactly the same.

A further embodiment of the invention illustrates a pneumatic or a hydraulic version of the electric rotary actuator. In this embodiment the rotor includes a low inertia non-rotating member having a plurality of collapsible vanes peripherally distributed thereon. The vanes cooperate to form clearance volumes between adjacent vanes and the housing. These volumes may be considered as variable volume displacement chambers which collapse at the same speed as the rotating force vector. Commutator means sequentially introduce pressurized fluid into the displacement chambers to produce a tangentially rotating force vector similar to the force vector produced by the electric actuator.

A further embodiment of the present invention illustrates a dual mode actuator that combines the features of the electric and pneumatic or hydraulic actuators into an integrated unit to power a common shaft. The dual mode actuator can be operated in either electric or hydraulic (or pneumatic) modes or in a combined mode during which time it can be simultaneously electrically and hydraulically (or pneumatically) operated thereupon developing twice the output power.

A principal limit to the output torque delivered is the strength of the output gear. It is well known that the load carrying capacity of a gear increases as the square of its diameter. Consequently in certain applications it is desirable to make the output gear as large as possible. A further embodiment of the invention increases the load carrying capacity of the actuator by situating the rotor inside the output gear.

A feature of the present invention is the use of the eccentrically mounted rotor having a plurality of radial projections thereon. The interaction between these radial projections and a coil or displacement chamber produces in cooperation with a commutator means a rotating tangential force vector. The actuator displays a high torque to inertia ratio and a high efficiency at rated loads. The development of the tangentially situated force vector permits the development of torques that are substantially larger than the torque developed by prior art actuators of the similar size. In addition the use of the non-rotating orbiting rotor in low gearing applications reduces the gear contact velocities between the rotor and output gear or member yielding a simpler and more reliable design.

Many other advantages features and objects of the invention will be clear from the detailed description of the drawings.

BRIEF DESCRIPTION OF THE DRAWINGS

In the drawings:

FIG. 1 is a cross-sectional view of an electric rotary actuator.

FIG. 2 is a cross-sectional view taken through Section 2—2 of FIG. 1.

FIG. 3 is a cross-sectional view taken through Section 3—3 of FIG. 1 and illustrates the placement of the various bearing of the actuator.

FIG. 4 pictorially illustrates the excitation sequence for the rotary actuator.

FIG. 5 illustrates a reversing circuit for energizing the coils of the stator of the rotary actuator.

FIG. 6 illustrates a cross-sectional view of an inverted rotary actuator.

FIG. 8 is an orthogonal view of the inverted rotary actuator.

FIG. 9 illustrates a cross-sectional view of an alternate electric actuator having eight poles.

DETAILED DESCRIPTION OF THE DRAWINGS

Figure 12:
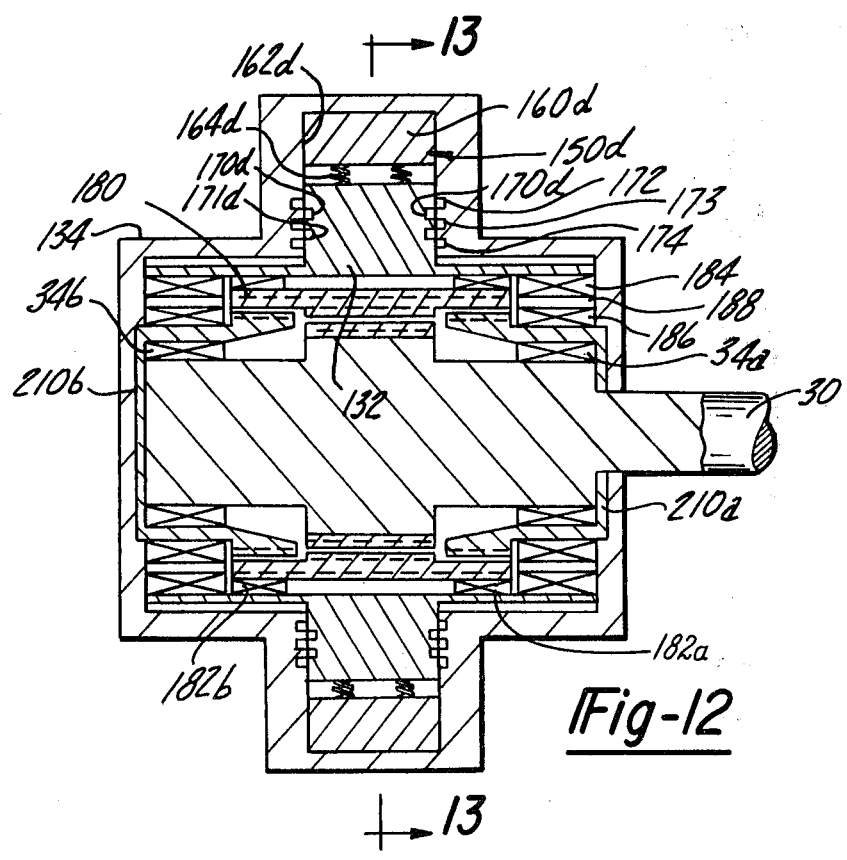
FIG. 12 illustrates a cross-sectional view of a pneumatic or hydraulic actuator.

Reference is now made to FIGS. 1, 2 and 3 which illustrate one embodiment of the present invention. There is shown a four pole rotary actuator 20 comprising a housing 22 having situated therein a rotor 24 constructed of a ferro-magnetic material and eccentrically located in driving engagement with an output gear 26. The output gear 26 is disposed in driving engagement with a shaft 30. The shaft 30 is maintained in radial alignment with the axis of rotation 32 by the bearings 34a and b. The motion of rotor 24 is transmitted to the output gear 26 through a ring gear 40. The center or axis of the ring gear 40 is denoted by numeral 42. The rotor 24 and ring gear 40 are maintained in a floating relationship relative to the output gear by the interaction of the rotor 24 with the eccentric bearing comprising bearings 44a and b which are eccentrically located relative to bearings 46a and b by the eccentric spacers 48a and b. In a low gear ratio configuration the rotor and ring gear are integral. (In the high gearing ratio configuration, an example of which is shown in FIG. 12. The ring gear is driven by the rotor through drive bearings and the ring gear 40 rotates slowly while the rotor 24 does not rotate.) The rotor 24, output gear 26 and ring gear 40 are maintained in axial alignment within the housing 22 by the thrust bearings 52, 54 and 56.

The actuator 20 further includes a stator 70 that is preferably fabricated of magnetic laminates. The stator 70 comprises a continuous laminate design however other configurations including a segmented stator design may be substituted. As illustrated in FIG. 2 the stator 70 comprises a four pole configuration however additional magnetic poles may be employed depending upon the application of the actuator to a specific purpose. The stator 70 further comprises a plurality of projecting members forming poles 72a-d and 74a-d adapted to receive a plurality of coils 76a-d and 78a-d. The physical placement of the opposing poles 72 and 74 and the placement of their respective coils 76 and 78 form the electrical poles on stator 70 as well as cooperate to form a plurality of radially situated coil spaces.

The rotor 24 further includes a plurality of radial projections or rectangular poles 80a-d equal in number to the number of coil spaces formed by the stator poles. In addition the coils 76, 78 are so situated relative to the plane of the rotor 24 such that when they are excited they produce a tangential electromagnetic force that is perpendicular to the radial projections 80. In addition the rotor 24 further includes a plurality of circular holes 82a-d that are sized to receive reaction pins 60a-d. The rotor 24 is constrained to move within the housing in an orbiting, non-rotating motion by the interaction of the circular holes (82a-d) of the rotor 24 with its corresponding reaction pins (60a-d). The stator 70 further includes a plurality of holes 86 which are adapted to receive a plurality of bolts (not shown) which serve to mount the stator 70 to the housing 22.

TABLE I

| EXCITATION SEQUENCE FOR 4 POLE ACTUATOR ||||||||||
|---|---|---|---|---|---|---|---|---|---|
| DIRECTION OF ROTOR ORBIT | STEP NO | COIL EXCITATION ||||||||
| | | 76a | 78a | 76b | 78b | 76c | 78c | 76d | 78d |
| CLOCKWISE | 1 | ON | | ON | | | | | |
| | 2 | | ON | ON | | | | | |
| | 3 | | | | | ON | | ON | |
| | 4 | ON | | | | | | ON | |
| COUNTER-CLOCKWISE | 1 | | ON | | | | ON | | ON |
| | 2 | | | | | | ON | | ON |
| | 3 | | | | ON | ON | | | |
| | 4 | | ON | ON | | | | | |

The method of moving the rotor 24 is discussed below. By sequentially exciting coils 76a-d and/or 78a-d the rotor 24 will be forced to move in an orbiting manner with respect to the reaction pins 60a-d. More specifically, it should be recalled that stator 70 comprises a plurality of poles 72a-d and 74a-d. These poles contain respective coils 76a-d or 78a-d. The coils 72a-d are situated on the right hand side of the respective rotor projections 80a-d while coils 78a-d are situated on the left hand side of each rotor projection. By appropriately exciting particular coils 76a-d each of the rotor rectangular poles or projections 80 will be attracted to move to the right. By exciting the coils 78 the rotor projections will be moved to the left. It should be appreciated that upon the selective activation of any coil a tangential force of attraction, $F_i$ where $i=1, 2, 3, 4$, will be generated to draw the appropriate rotor projection to the corresponding activated coil.

The forces of attraction $F_1-F_4$ are illustrated in FIGS. 4a–4d which diagrammatically illustrates an excitation sequence to cause the rotor 24 to orbit about the reaction pins 60 in a clockwise manner. A clockwise orbiting motion of the rotor may be obtained by the serial excitation of one half of the coils 76a–d located on the right hand side of each rotor projection 80. As an example, first coils 76a and b are excited. The magnetic forces, $F_1$ and $F_2$ so developed tend to move the rotor 24 to the right towards stator pole 72a and downward towards stator pole 72b. Coil 76a is then deactivated and coil 76c activated. With both coils 76b and c excited the rotor 24 will have a tendency to move down and to the left. Coil 76b is then deactivated and coil 76d activated. Thereafter coil 76c is deactivated and coil 76d again excited completing a four (4) step excitation sequence which is then continuously repeated.

Table 1 summarizes the coil excitation sequences to achieve both a clockwise and a counter-clockwise orbiting motion of the rotor.

While the above discussed coil excitation sequences require the selective excitation of only the coils 76 or 78 in a paired manner, other excitation sequences utilizing the combined excitation of selected ones of both of the coils 76 and 78. As an example, one such combined sequence would require the following sequence of coil pair activation, 76a–78c, 76b–78d, 76c–78a and 76d–78b.

Reference is briefly made to FIG. 5 which illustrates a circuit for the distribution of power to the appropriate coils 76 and 78. As depicted schematically in FIG. 5 coils 76a–d and 78a–d are supplied with electrical power from power source 90 via the step and sequencing logic 92 and the switches 93 and 94. In operation the step and sequencing logic 92 will control switch 93 so that power is distributed to either coils 76a–d or to coils 78a–d. If power is to be supplied to coils 76a–d then the logic 92 will command switch 94 such that coils 78a–d are grounded. The logic 92 will then generate the coil excitation sequence previously described. Methods of commutating or selectively exciting coils once the excitation sequence is specified are known as discussed by Pressley in U.S. Pat. No. 3,770,997 which is expressly incorporated herein by reference.

Figure 7:
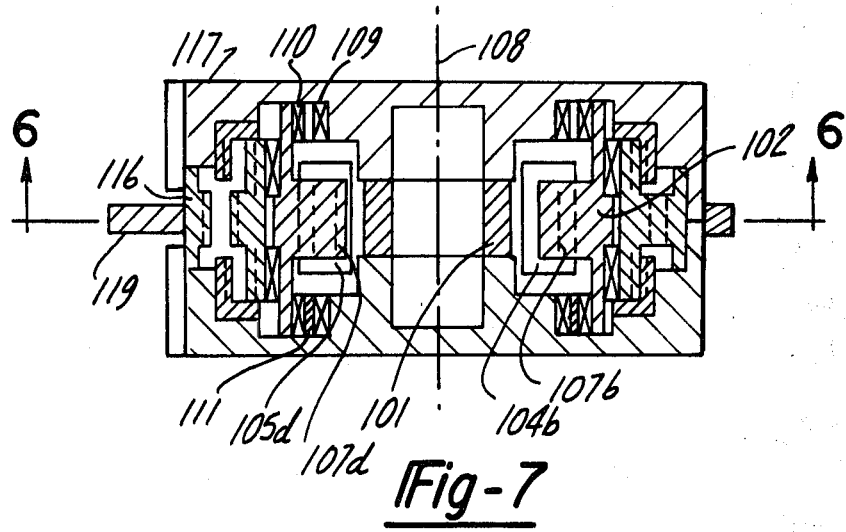
FIG. 7 is a cross-section view taken through Sections 7—7 of FIG. 6.

Reference is now made to FIGS. 6, 7 and 8 which illustrates an alternate embodiment of the present invention. It is well known that a principal limit to the torque transmitted to a load is dependent upon the strength of the output gear. It can be shown that the load carrying capacity of the output gear increases as the square of its diameter. Consequently under certain circumstances it may be desirable to make the output gear as large as possible. One way of achieving this while still packaging an actuator in a small housing is by utilizing an inverted gearing arrangement. FIGS. 6 and 7 illustrate cross-sectional views of a four pole array actuator 100 having a stator 101 that is situated within rotor 102. The stator comprises a plurality of poles 103a–d and 104a–d that are adapted to receive cooperating coils 105a–d and 106a–d. The rotor 102 includes a number of inwardly directed radial projections 107a–d that are adapted to fit between the spaces formed by the stator poles 103a–d and 104a–d. These rotor projections 107 are ferromagnetic and responsive to the magnetic fields created upon the excitation of the coils 105 and/or 106. The rotor 102 is positioned eccentrically relative to the central axis 108 by bearings 109,110 and the eccentric spacer 111. The rotor further includes a ring gear 112 which may be integrally formed in its outer surface.

The rotor further includes a plurality of holes 113a–d that are adapted is coact with reaction pins 114a–d in a manner previously described. The rotor is caused to orbit relative to the stator 101 by the interaction with these reaction pins.

An outer gear 116, is positioned concentric to the central axis 108 and the housing 117 and is adapted to engage and be driven by the ring gear 112. The outer surface of the outer gear contains a tab 119 that is adapted to engage a cooperating apparatus (not shown) to be driven. The tab 119 extends through an opening 120 in the housing 118. The relationship between the tab 119, the outer surface of the output gear 116 and the opening 120 in the housing is more clearly illustrated in FIG. 8.

Figure 11:
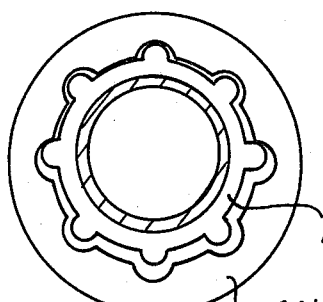
FIG. 11 illustrates a cross-sectional view of the ring gear-stationary gear mesh.
Figure 10:
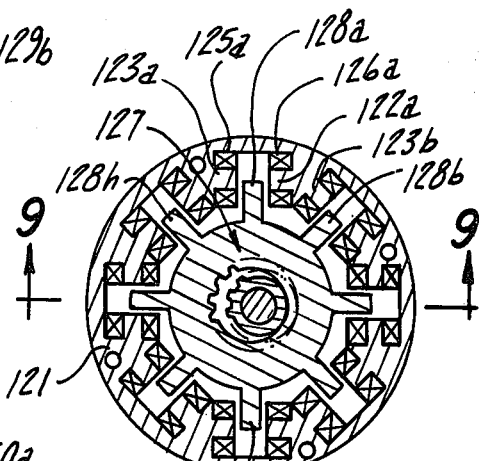
FIG. 10 illustrates a cross-sectional view through Section 10—10 of FIG. 9 of a stator having eight poles.

Reference is made to FIGS. 9, 10 and 11 which illustrate a sectional view of an eight (8) pole electric rotary actuator, a sectional view illustrating the relationship of the rotor 127 to the stator 121, and a plan view showing, in isolation, the gear mesh which may be used to replace the reaction pins and rotor holes previously discussed.

More specifically the actuator includes a laminated stator 121 having a first set of eight poles 122a–h and another set of opposingly situated poles 123a–h. The poles 122 and 123 are adapted to receive coils 125a–h and 126a–h respectively. The actuator further includes a rotor 127 having eight radially situated projections 128a–h extending into the spaces formed by the stator poles 122 and 123. In addition, the rotor 127 is fabricated with a pair of gears 129a and b disposed about periphery of the rotor flange 131. The gears 129a and b are eccentrically positioned relative to coacting stationary gears 130a and b. The ground or stationary gears 130 are fixed to and situated concentric with the housing 22 of the actuator and to axis 108. The gears 129 may be operatively fixed to the rotor or fabricated as an integral part of the rotor flange 131.

The gear mesh between the gear 129b and the stationary gear 130b is illustrated in FIG. 11.

The operation of the actuator discussed above and shown in FIGS. 9–11 is similar to the operation of the four pole actuator shown in FIGS. 1–3. In response to the magnetic fields generated upon the selective activation of coils 125a–h and/or 126a–h the rotor 127 will be displaced relative to the stator 101 thus causing the gears 129a and b to be displaced relative to the stationary gears 130a and b. The interaction between the gears 129 and 130 causes the rotor 127 to exhibit an orbiting motion relative to the output gear 26. The ring gear 40 situated on the rotor coacts with the output gear 26 to power the shaft 30.

One possible excitation sequence for the coils 125 or 126 can be derived using a similar rationale to that employed in the excitation sequence for the four pole rotary actuator. It should be recalled that half of the right hand or left hand coils were activated at any specific time. Using this philosophy an eight (8) step sequencing logic exciting four coils at any time can be utilized. As an example the excitation sequence to produce a clockwise orbiting motion of the rotor 127 which in turn causes a counter-clockwise motion of the shaft 30 is as follows: 125*abcd*-125*bcde*-125*cdef*-125*defg*-125*efgh*-125*fgha*-125*ghab*-125*habc*.

The coils 126 may be activated to achieve a clockwise rotation of the shaft 32. One such sequence is as follows: 126*hgfe*-126*gfed*-126*fedc*-126*edcb*-126*dcba*-126*cbah*-126*bahg*.

Figure 13:
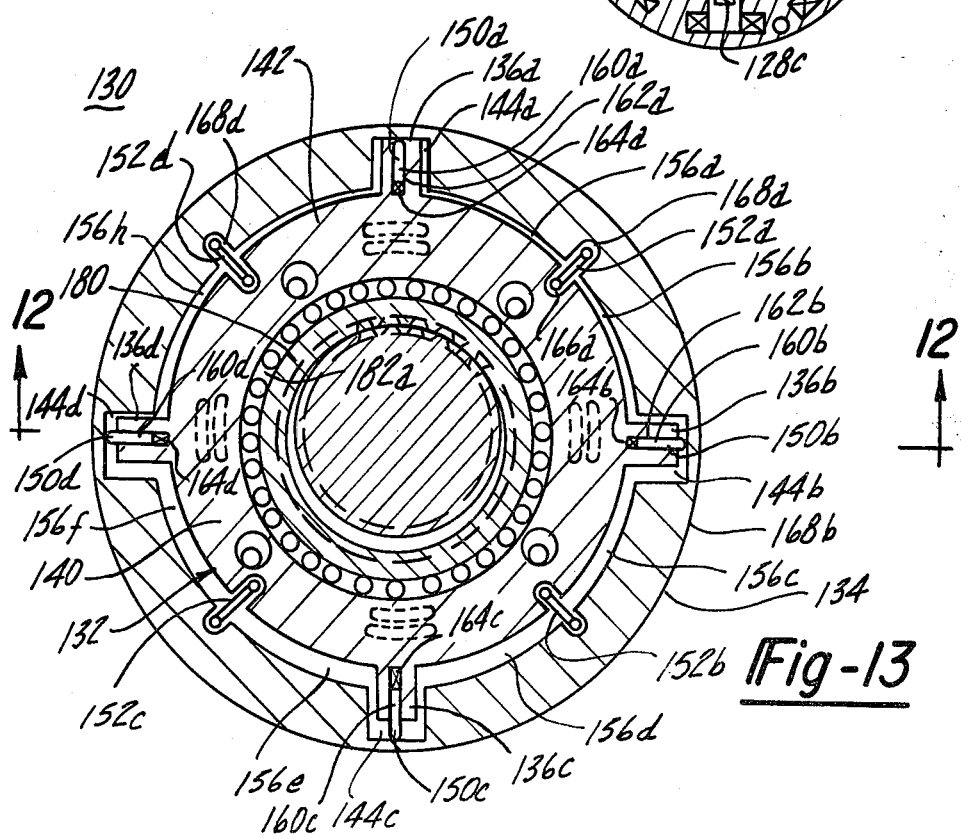
FIG. 13 illustrates a side view of the pneumatic or hydraulic actuator of FIG. 12.

Reference is now made to FIGS. 12 and 13 which show a pneumatic or hydraulic version of the four pole electric rotary actuator in a high gearing configuration. The eccentric bearing and epicyclic transmission used herein are similar to that previously discussed and will not be discussed further. The pneumatic or hydraulic version of the actuator 130 includes a rotor 132 which orbits within a housing 134. The rotor 132 contains a plurality of radial projections 136a–d extending in the housing 134. While the actuator 130 illustrates a rotor 132 having four projections 136 other rotor configurations may be substituted. The rotor 132 is separated from a ring gear 180 by a set of ring gear drive bearings 182a and b. The orbiting motion of the rotor 132 is transferred to the ring gear 180 through these ring gear drive bearings. The rotor 132 is eccentrically mounted relative to the axis of shaft 30 by the interaction of the bearings 184 and 186 and the eccentric spacer 188 in response to the hydraulic or pneumatic forces generated on the projections 136a–d and due to the interaction between the ring gear and the stationary or ground gears 210a and b. The rotor will move with orbiting motion to drive the shaft through the output gear to the ring gear 180. In the embodiment illustrated in FIGS. 12 and 13 the ring gear will move with both rotating and orbiting motion.

The housing 134 further includes a plurality of slots 144a–d corresponding to one of the rotor projections 136a–d. The slots are adapted to loosely receive each of the poles 136. Inspection of FIG. 13 reveals that the poles 136 on the rotor 132 and the slots 144 on the housing 134 create a plurality of interfitting lands and recesses. Each land and recess is separately by vanes 150a–d and 152a–d. The volumes between adjacent vanes 150 and 152 form a plurality of displacement chamber 156a–h. Each of the vanes form a pneumatic or hydraulic seal between its respective land and recess. By way of example, vanes 150a–d is of the type which comprises a piston 160 that is received within a bore 162 and which is biased by the action of spring 164 against the recess formed within the housing 134. To achieve a compact motor design having a housing which is characterized by a relatively thin wall, vanes 152a–d are preferably of the captured vane type that are suitably received within notches 166a–d and 168a–h. Those skilled in the art will appreciate that if the land area of the housing was increased in thickness the captured vane 152 may be replaced by the reciprocating piston type vane 150 wherein a spring and piston would be inserted within a bore within the land area of the housing and biased against the recessed area of the rotor 132. It should be appreciated that the vanes 150 and 152 used to form the plurality of displacement chambers 156 are used to obtain a compact motor design, however, any of the methods used in fluid motors may be applied, including radial pistons, bellows, flexible diaphragms, etc., could be used to form displacement chambers. As can be seen from FIGS. 12 and 13 the rotor 132 and housing 134 form a powering element which may be considered as a positive displacement low inertia non-rotating vane motor, which generates a tangential force vector on each rotor projection 136a–d which rotates at a relatively high speed in either direction. The direction of rotation is determined by sequentially pressurizing certain displacement chambers 156 while depressurizing others as described below.

Figure 14:
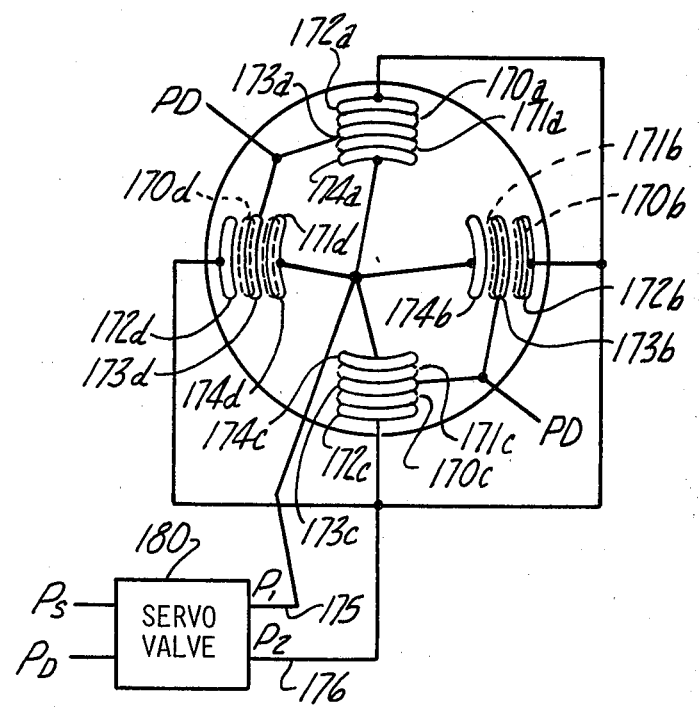
FIG. 14 illustrates a pneumatic commutator.

Reference is now made to FIG. 14 which schematically illustrates a pneumatic or hydraulic commutator which may be used to selectively pressurize the displacement chambers 156 to obtain the clockwise and counter clockwise rotation of the shaft 30. A similar technique is shown by Boyadjieff in U.S. Pat. No. 3,516,765 which is expressly incorporated by reference. Pairs of kidney shape of ports 170a–170d and 171a–171d are located in the rotor faces, and pairs of ports 172a–172d, 173a–173d, and 174a–174d are located in the housing. These ports are connected to a servo valve 180 through passages fabricated in the housing. The intermediate housing ports 173a–d are always maintained at a discharge pressure $P_d$. The housing ports 174a–d are connected to the $P_1$ servovalve outlet port 175. The housing ports 172a–d are connected to the $P_2$ servo valve outlet port 176. The rotor ports 170a–d are connected to the pressure chambers 156a, d, e, g, which as illustrated in FIG. 13, are displaced in the clockwise direction from the rotor projections 178. The rotor ports 171a–d are connected to the pressure chambers 156b, d, f, h, which are displaced in the counterclockwise direction from the rotor projections.

For the clockwise direction of rotation, the input signal to the servovalve 180 causes pressure $P_1$ to be high and pressure $P_2$ to be at the discharge pressure $P_d$. For the commutator position shown in FIG. 14, the pressures in rotor ports 171c and 171d are high or at pressure $P_s$ and the pressures in all the other ports are low. The high pressure in ports 171c and 171d will be communicated to two of the chambers such as 156d and f thereby applying a tangential pressure force to the projections 136c, d to move the rotor. As the rotor moves a small distance with orbiting motion, rotor port 171c will be brought into communication with housing port 173c, and the pressure in rotor port 171c will drop to the low or discharge pressure. At the same time, rotor port 171a will be brought into communication with $P_1$ port 174a, and the pressure in rotor port 171a will increase to high valve thereby applying a pressure force to projection 136a. After one quarter cycle of orbiting motion, rotor port 171d will be brought into communication with stator port 173d, and the pressure in rotor port 171d will drop to low. At the same time, rotor port 171b will come into communication with port 174b, and the pressure in rotor port 171b will increase to a high value. As the rotor continues to orbit the $P_1$ pressure will be directed into two of the displacement chambers at a time to achieve a pressurizing sequence and rotating force vector similar the electrical sequencing shown in Table I.

For the opposite direction of rotation, the servovalve is switched so pressure $P_2$ is high, and pressure $P_1$ is low.

Figure 15:
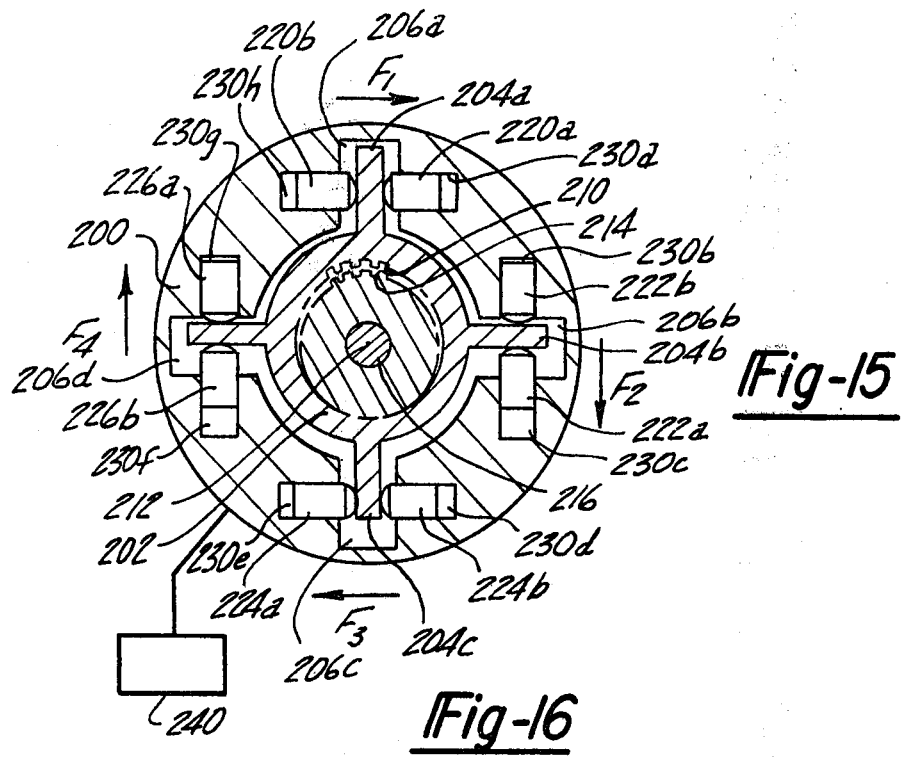
FIG. 15 illustrates of 4 pole hydraulic motor.

Reference is now briefly made to FIG. 15. The embodiment of the invention illustrated in FIG. 14 is conceptually closer to the operation of the electric actuators previously discussed than with the hydraulic actuator illustrated in FIGS. 12 through 14. FIG. 15 schematically illustrates another hydraulic actuator comprising a housing 200 having situated therein a rotor 202 having a predetermined number of radially extending projections 204. In the embodiment illustrated herein, the rotor includes four projections 204a–d. Each of the projections 204a–d is sized to be received within a recess 206a–d fabricated within the housing 200. The rotor 202 has fabricated on its inner surface a ring gear 210. The rotor is maintained within the housing by appropriate bearings and the like, such that in response to forces input to the projections 204, the rotor will be caused to be moved in an orbiting manner relative to the axis 212. The ring gear is drivingly positioned relative to an output gear 214 which is coupled to a shaft 216. The actuator further includes four pairs of hydraulically-actuated pistons 220a,b, 222a,b, 224a,b and 226a,b. Each piston 220-226 is mounted perpendicularly to its corresponding rotor projection 204. Each piston is mounted within a pressure chamber 230a-h. Each of the pressure chambers 230a-h is connected via internal fuel passages (not shown) to a hydraulic or pneumatic commutating means 240. By selectively pressurizing and depressurizing particular chambers 230, the corresponding pistons will be forced to move outward therein applying a tangential force to a coacting rotor projection 204. By commutating, that is, by sequentially pressurization and depressurization various pressure chambers 230, a rotating tendential force can be created to cause the rotor 202 to move in an orbital manner relative to the output gear therein driving the output gear 214 and shaft 216. Using the commutation sequence illustrated in Table 1 for the electric actuator, a typical commutation sequence for the hydraulic or pneumatic actuator illustrated in FIG. 15, can be achieved. One such commutation sequence, which requires the selective pressurization and depressurization of two adjacent pressure chambers 230a-h, is as follows. To achieve a clockwise orbiting motion of the rotor 220, pressure chamber 230h and 230b would first be pressurized therein inparting to the rotor the forces $F_1$ and $F_2$ as illustrated in FIG. 15. After a period of time, the pressure chamber 230h would be depressurized and pressure chamber 230d pressurized, thus causing the rotor 202 to move under the influence of force $F_2$ and a new force $F_3$. In this manner, selective pairs of pressure chambers are activated and then sequentially deactivated to obtain a rotating force vector. A complete sequence of excitation would be as follows: 230h-230b, 230b-230d, 230d-230f, 230f-230h, 230h-230b. The above sequence may be reversed or altered to achieve a counterclockwise orbiting motion of the rotor 202 relative to the output gear 214.

Figure 16:
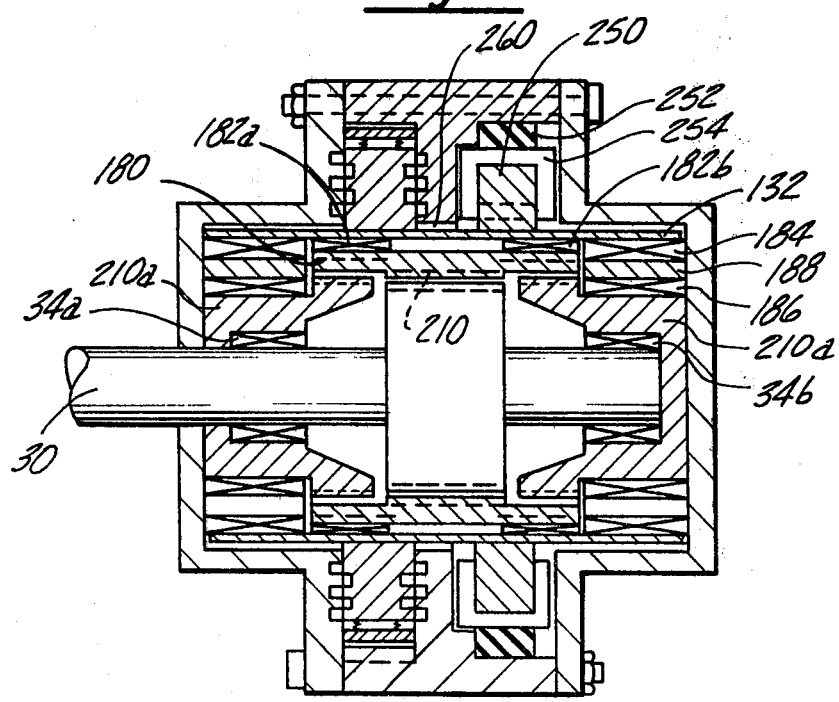
FIG. 16 illustrates a cross-sectional view of a dual mode actuator.

Reference is now made to FIG. 16 which illustrates a dual mode actuator 300. A comparison of FIGS. 12 and 16 would reveal that the dual mode actuator 300 is substantially equivalent to the hydraulic or pneumatic actuator 130 illustrated in FIG. 12 with the following exception. The rotor 132 has been modified to include a plurality of radially situated projections 250a-d. These projections can be identical to projections 80a-d of the electric actuator as illustrated in FIG. 2. The radial projections 250 are fabricated from ferromagnetic material and may be an integral part of the rotor 132 or attached thereto in a known manner. The housing of the actuator illustrated in FIG. 12 is modified to accommodate a stator 252 having a plurality of coils 254 situated thereon. The relationship of the stator 254, coils 254 and rotor projections 250 can be identical to that illustrated in FIG. 2. The housing is further modified to incorporate a seal 260 to isolate the hydraulic or pneumatic fluid within the left hand position of the actuator from entering into the electric or right hand portion of the actuator. The operation of the actuator illustrated in FIG. 16 is identical with the operation of the actuator illustrated in FIG. 2 or FIG. 12. The actuator may be operated in either a pure electric mode or in a pure hydraulic or pneumatic mode. In addition, by simultaneously activating the appropriate coils 254 and by introducing pressurized fluid to the pressure chambers within the hydraulic portions of the dual mode actuator, a dual mode of operation can be realized.

Many changes and modifications in the above-described embodiments of the invention can of course be carried out without departing from the scope thereof. Accordingly, that scope is intended to be limited only by the scope of the appended claims.

Having thus described the invention, what is claimed is:

1. An actuator comprising:
    an output member rotatably mounted therein;
    epicyclic transmission means, for driving said output member in response to forces input thereto;
    rotor means, eccentrically mounted relative to the axis of rotation of said output member, and adapted to rotatably engage said transmission means; wherein said rotor includes radially projecting rectangular poles;
    first means for producing on a specified member of said poles a force vector directed substantially perpendicular thereto;
    reaction means for causing said rotor to move in an orbiting, non-rotating manner relative to said output axes, wherein said rectangular poles contain material reactive to magnetic forces and wherein said rectangular poles are located equidistant from one another; and wherein said first means includes:
    stator means responsive to electrical actuation signals for generating a magnetic field proximate to a predetermined number of said rectangular poles, said magnetic field interacting with said predetermined number of poles and directed perpendicular to the radius vector from the center of said rotor means through each of said poles, said stator means including two stator poles oriented perpendicular to each of said rectangular poles, wherein each of said stator poles carries an electrical coil adapted to receive the electric actuation signal and wherein the plane of each electric coil is parallel to its respective rectangular pole.

2. The actuator as defined in claim 1 further including:
    means for selective and magnetically exciting a predetermined number of aid stator poles for creating a magnetic force and for displacing said rotor relative to said reaction means, and
    means for sequencing the magnetic forces generated to create a rotating magnetic force vector for displacing said rotor means relative to said reaction means.

3. The actuator as defined in claim 2 wherein said reaction means comprises:
    a ring gear operatively connected to and movable with said rotor means,
    stationary gear means, fixed relative to and having a determinable number of gear teeth for loosely engaging said ring gear and for interacting with said ring gear to permit said ring gear to displace therebetween in an orbiting fashion.

4. The actuator as defined in claim 1 wherein said poles are located equidistant from one another and wherein said poles and that portion of said rotor means between adjacent poles forms alternating areas of lands and recesses; and wherein
    said first means includes:
    stator means, adapted to receive pressurized fluid and to loosely receive said rotor means and wherein said stator means includes areas of recesses and lands oppositely positioned to and spaced apart from corresponding areas of said lands and recesses of said rotor means; and vane means for interconnecting oppositely positioned land areas of said rotor means to said recessed areas of stator means and for connecting oppositely positioned recessed areas of said rotor means to said land areas of said stator means, for establishing a variable volume chambers therebetween and for establishing a fluid tight seal of one of said chambers.

5. The actuator as defined in claim 4 further including:

pressurizing means for sequentially pressurizing a predetermined number of said chambers and for depressurizing a predetermined number of one of said chambers to produce on said rotor means tangential forces.

6. An actuator comprising:

an output member rotatably mounted therein including an output gear supporting a shaft defining an axis of rotation, including a first set of bearings positioned coaxially to the axis and juxtaposed on each side of said output gear, each bearing of said first set of bearings supported within a cup-shaped cavity within a housing;

epicyclic transmission means for driving said output member in response to forces input thereto including a second set of bearings wherein each bearing of said second set of bearings is positioned in coaxial alignment about a corresponding one of said bearings of said first set of bearings and spaced therefrom by the walls of the corresponding cup-shaped cavity;

rotor means, eccentrically mounted relative to the axis of rotation of said output member, and adapted to rotatably engage said transmission means; wherein said rotor includes radially projecting rectangular poles;

first means for producing on a specified number of said poles a rotating force vector directed substantially perpendicular thereto;

reaction means for causing said rotor to move in an orbiting, non-rotating manner relative to said output axis, wherein said poles contain material reactive to magnetic forces and wherein said poles are located equidistant from one another; and wherein said first means includes:

stator means responsive to electrical actuation signals for generating a magnetic field proximate to a predetermined number of said poles, said magnetic field interacting with said poles and directed perpendicular to the radius vector from the center of said rotor means through each of said poles, said stator means including two stator poles oriented perpendicular to each of said rectangular poles, wherein each of said stator poles carries an electrical coil adapted to receive the electric actuation signal and wherein the plane of each electric coil is parallel to its respective rectangular pole.

7. The actuator as defined in claim 6 further including:

means for selectively and magnetically exciting a predetermined number of said poles for creating a magnetic force therebetween and for displacing said rotor relative to said reaction means, and means for sequencing the magnetic forces generated to create a rotating magnetic force vector for displacing said rotor means relative to said reaction means.

8. The actuator as defined in claim 7 wherein said reaction means comprises:

said rotor means having a plurality of holes located therein; and reaction pin means located within each of said holes, for engaging said rotor means.

9. The actuator as defined in claim 7 wherein said reaction means comprises:

a ring gear operatively connected to and movable with said rotor, stationary gear means, fixed relative to and having a determinable number of gear teeth for loosely engaging said ring gear and for interacting with said ring gear to permit said ring gear to displace therebetween in an orbiting fashion.

* * * * *